(No Model.)

J. J. SANDLER.
NUT LOCK.

No. 549,878. Patented Nov. 12, 1895.

Witnesses:
John Whennen
George P. Sandler

Inventor:
John J. Sandler.

UNITED STATES PATENT OFFICE.

JOHN J. SANDLER, OF SHAMOKIN, PENNSYLVANIA.

NUT-LOCK.

SPECIFICATION forming part of Letters Patent No. 549,878, dated November 12, 1895.

Application filed May 14, 1895. Serial No. 549,339. (No model.)

*To all whom it may concern:*

Be it known that I, JOHN J. SANDLER, a citizen of the United States, residing at Shamokin, in the county of Northumberland and State of Pennsylvania, have invented a new and useful Nut and Bolt Lock, of which the following is a specification.

My invention has relation to devices for locking nuts upon bolts; and it consists in the detailed construction and combination of parts which will be hereinafter described and claimed.

The objects of my invention are attained by the mechanism illustrated in the accompanying drawings, in which—

Figure 1:
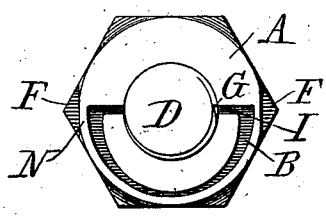
Figure 2:
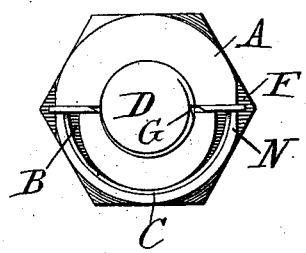
Figure 3:
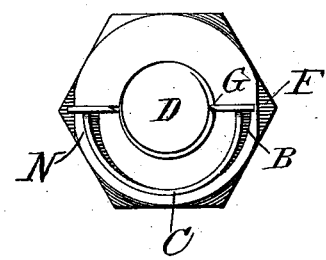
Figure 4:
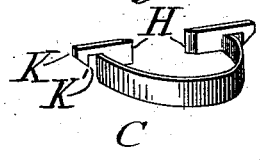
Figure 5:
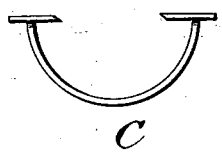

Figure 1 is a top plan view of a bolt and nut embodying my invention, the spring and pawls being removed; Fig. 2, a similar view, showing the spring with its pawls in inoperative position; Fig. 3, a similar view showing the spring with one of its pawls in operative position; Fig. 4, a perspective of the spring with its pawls, and Fig. 5 a top plan view of Fig. 4.

Similar letters of reference indicate corresponding parts in all the figures.

A represents a nut threaded to fit the threaded end of bolt D. The outer face of the nut has a semicircular recess B, leaving a semicircular rib N near the periphery of the nut, which recess is wider at its extremities than at its central portion to provide space for the movement of the spring hereinafter described. This recess has at each end an extension I, passing radially to the bolt-opening.

Seated in the recess B is a flat curved spring C, whose resiliency tends to bring its ends toward the bolt-opening. This spring has a width corresponding to the depth of recess B, the latter at its central portion securely holding the spring in place. The ends of the spring are turned inwardly at a right angle, forming pawls H, which lie in the extensions I of the recess B. The bolt is provided with a longitudinal groove G, into which fit the pawls I I. The pawls each have a part K extending outwardly above the spring and provided with a tooth or hook K' on the under side to engage over the rib N, the corners of the nut being recessed at F to provide a seat for the tooth, so that the extensions K shall not lie beyond the sides of the nut.

The operation of my invention is as follows: The spring C is seated in the recess B, with the teeth in engagement with the rib N, as shown in Fig. 2. The nut may then be turned on the bolt, and as soon as the pawls pass the outer end of the bolt they may be released from the rib N by raising the teeth K', when the resiliency of the spring forces the pawls against the bolt. The recess G and the pawls are so beveled that they permit the nut to be turned on; but any attempt to turn the nut off is met by one of the pawls catching against the radial shoulder of the groove.

When it is desired to turn off the nut, the pawls H must be pulled outwardly until the hook K' catches over the rib N, this being made easier by the inclination extending from the outer end of the extension K to the lower point of the tooth K'.

The length of the pawls may be such that when the nut is being turned on the rising of the pawls out of the grooves in the bolt will automatically lock the tooth K' over the rib N; but this, however, is not my preferred construction.

What I claim as my invention, and desire to secure by Letters Patent, is—

1. In a nut and bolt lock, in combination with a bolt having a longitudinal groove, a nut recessed in its outer face, a spring seated in said recess and having an inward flexure, and a pawl at each end of the spring extending inwardly to engage the groove in the bolt, and outwardly to engage the edge of the nut and hold the pawls retracted from the groove of the bolt, substantially as set forth.

2. In a nut and bolt lock, a bolt having a longitudinal groove, a nut having a semicircular recess in its outer face said recess having extensions entering the bolt opening, a spring seated in said recess and having an inward flexure and pawls entering said extensions and engaging the groove in the bolt, said pawls having outwardly extending portions provided with teeth adapted to engage a portion of the nut to hold the pawls out of engagement with the nut, substantially as set forth.

3. In a nut and bolt lock, a bolt having a longitudinal groove, a nut having a recess in its outer face and the cut outs F, a bow spring seated in said recess and having an inward flexure, and catches at the end of the spring extending inwardly to engage the groove in the bolt, said catches having a beveled hook adapted to engage with a portion of the nut and lie in the cutouts F, substantially as set forth.

JOHN J. SANDLER.

Witnesses:
 GEORGE C. SANDLER,
 JOHN WHENNEN.